(12) United States Patent
Eckardt et al.

(10) Patent No.: US 10,236,085 B2
(45) Date of Patent: Mar. 19, 2019

(54) PRESSURE RELIEF SYSTEM FOR THE CONTAINMENT OF A NUCLEAR POWER FACILITY, NUCLEAR POWER FACILITY AND METHOD OF OPERATING A PRESSURE RELIEF SYSTEM

(71) Applicant: FRAMATOME GMBH, Erlangen (DE)

(72) Inventors: Bernd Eckardt, Bruchkoebel (DE); Norbert Losch, Offenbach (DE); Frank Zehe, Limburgerhof (DE)

(73) Assignee: Framatome GmbH, Erlangen (DE)

( * ) Notice: Subject to any disclaimer, the term of this patent is extended or adjusted under 35 U.S.C. 154(b) by 288 days.

(21) Appl. No.: 14/867,198

(22) Filed: Sep. 28, 2015

(65) Prior Publication Data

US 2016/0019987 A1 Jan. 21, 2016

Related U.S. Application Data

(63) Continuation of application No. PCT/EP2014/056064, filed on Mar. 26, 2014.

(30) Foreign Application Priority Data

Mar. 27, 2013 (DE) .................. 10 2013 205 525

(51) Int. Cl.
*G21C 9/004* (2006.01)
*B01D 47/10* (2006.01)
(Continued)

(52) U.S. Cl.
CPC ............ *G21C 9/004* (2013.01); *B01D 47/10* (2013.01); *G21C 19/303* (2013.01); *G21F 9/02* (2013.01);
(Continued)

(58) Field of Classification Search
CPC ................. G21C 9/004; B01D 47/10
See application file for complete search history.

(56) References Cited

U.S. PATENT DOCUMENTS 4,610,840 A * 9/1986 Leach .................... G21C 9/012
376/283
4,816,210 A 3/1989 Henry
(Continued)

FOREIGN PATENT DOCUMENTS

DE 3815850 A1 * 11/1989 ............. G21C 9/004
DE 3815850 A1 11/1989
(Continued)

OTHER PUBLICATIONS

Human translation of Foreign Reference WO90/16071 (equivalent document to the cited reference DE3815850) attached. 18 pages.*
(Continued)

*Primary Examiner* — Lily C Garner
(74) *Attorney, Agent, or Firm* — Laurence A. Greenberg; Werner H. Stemer; Ralph E. Locher

(57) ABSTRACT

A pressure-relief system for the containment of a nuclear power facility allows reliable operation of a wet scrubber for the pressure relief flow with a simultaneously compact structural design. The pressure relief system has a pressure relief line guided through the containment and can be closed by a shut-off valve, a wet scrubber arranged in a portion of the pressure relief line located inside the containment, for the pressure relief flow which forms in the pressure-relief mode when the shut-off valve is open, a reservoir arranged inside the containment and is fluidically connected to the remaining inner space of the containment such that any overpressure, with respect to the surroundings outside the containment, prevailing in the containment is transferred at least in part to the reservoir, and a supply line leading from
(Continued)

the reservoir to the wet scrubber for supplying the wet scrubber with fluid from the reservoir.

9 Claims, 1 Drawing Sheet

(51) Int. Cl.
  *G21C 19/303* (2006.01)
  *G21F 9/02* (2006.01)
  *G21C 9/06* (2006.01)
  *G21D 3/04* (2006.01)
(52) U.S. Cl.
  CPC ............... *G21C 9/06* (2013.01); *G21D 3/04* (2013.01); *Y02E 30/40* (2013.01)

(56) References Cited

U.S. PATENT DOCUMENTS

| | | | |
|---|---|---|---|
| 5,078,960 A * | 1/1992 | Berg | G21C 9/004 376/314 |
| 5,223,209 A | 6/1993 | Eckardt | |
| 5,473,647 A | 12/1995 | Eckardt | |
| 8,218,709 B2 * | 7/2012 | Eckardt | B01D 47/10 376/283 |
| 8,670,517 B2 | 3/2014 | Eckardt et al. | |
| 8,804,896 B2 | 8/2014 | Eckardt et al. | |
| 2012/0051488 A1 | 3/2012 | Eckardt et al. | |

FOREIGN PATENT DOCUMENTS

| | | |
|---|---|---|
| DE | 10328774 B3 | 1/2005 |
| DE | 10328773 B3 | 2/2005 |
| DE | 102010035509 A1 | 3/2012 |
| DE | 102010035510 A1 | 3/2012 |
| FR | 2675942 A1 | 10/1992 |
| FR | 2682214 A1 | 4/1993 |

OTHER PUBLICATIONS

Bernd Eckardt, Norbert Losch NRC Meeting on Containment Venting Systems Rockville, Jul. 12, 2012. "Filtered Containment Venting System Designs" Development, Features, Qualification, Applications.

* cited by examiner

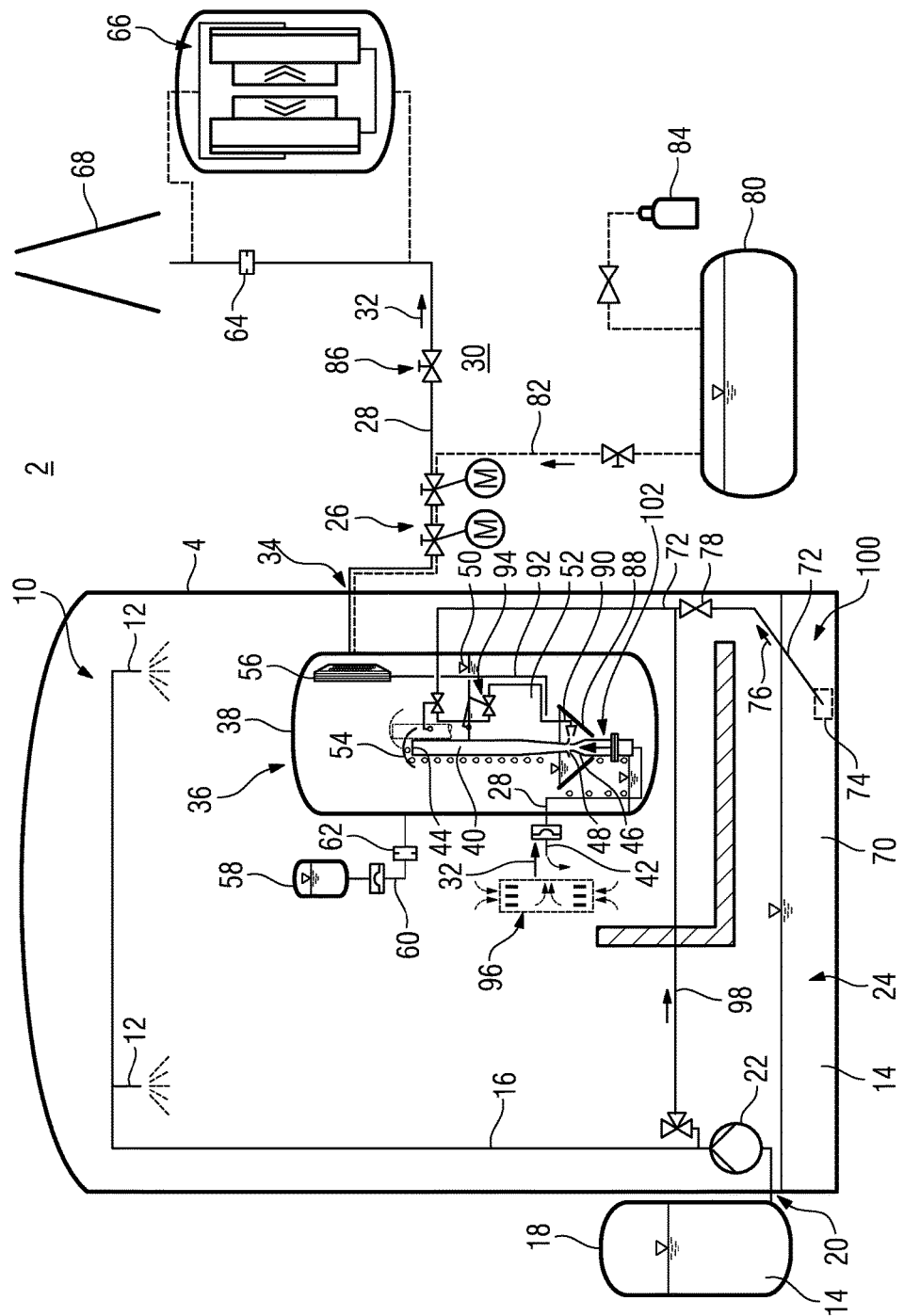

PRESSURE RELIEF SYSTEM FOR THE CONTAINMENT OF A NUCLEAR POWER FACILITY, NUCLEAR POWER FACILITY AND METHOD OF OPERATING A PRESSURE RELIEF SYSTEM

CROSS-REFERENCE TO RELATED APPLICATION

This is a continuation application, under 35 U.S.C. § 120, of copending international application No. PCT/EP2014/056064, filed Mar. 26, 2014, which designated the United States; this application also claims the priority, under 35 U.S.C. § 119, of German patent application No. DE 10 2013 205 525.0, filed Mar. 27, 2013; the prior applications are herewith incorporated by reference in their entireties.

BACKGROUND OF THE INVENTION

Field of the Invention

The invention relates to a pressure-relief system, also referred to as a pressure relief system, with integrated filtration for the containment of a nuclear power facility, in particular for a pressurized water reactor. It further relates to an associated operating method.

During major accidents in nuclear power plants involving a core meltdown, very high levels of airborne activity occur within the safety enclosure, also referred to as the containment, which can be released into the environment in significant quantities when there are large leakages and unpermitted overpressure situations. This airborne activity may in such cases cause high-level unwanted long-term land contamination in the area surrounding the nuclear power station, above all due to the high half-life periods of the different radio-nuclides contained, particularly iodine and cesium isotopes.

Different systems for overpressure limitation and pressure relief of the containment in accident situations are already installed in numerous nuclear power stations. These facilities allow the retention of aerosols and, in part, elementary iodine too, and also organic iodine compounds (organoiodine), and they often contain wet cleaning systems or scrubber systems for the pressure-relief flow, also referred to as the venting flow, with substantial water reservoirs in terms of volume in the form of tanks and other storage containers.

These large water reservoirs are necessary in order to limit the undesirable effects of the decay heat from the retained radioactive aerosols and iodine, namely temperature rise to water evaporation, and allow the cooling of hot gases to boiling point temperature in the venting mode. A drying-out of the scrubber system would jeopardize the retention function and, in addition, cause the retained activity to be released again.

Furthermore, research on containment behavior in existing plants has shown that in certain accident scenarios significantly increased activity and, consequently, aerosol and iodine decay heats can be released. The water requirement in the scrubber facilities of the pressure relief system is therefore significant in such situations and leads to correspondingly high-volume facilities which usually can no longer be housed in existing buildings. This means new installation buildings which bring with them substantial costs.

Existing retrofitted facilities such as scrubbers or sand bed filters, for example, and corresponding combinations of these, solve the problem of organoiodine retention, which has recently had to be re-evaluated on the basis of corresponding research findings, with a great deal of success in some cases. However, facilities of this kind still necessarily have to be protected from external influences, as a result of which they prove very expensive to construct, given their customary installation outside the containment, and therefore generate substantial costs. In many cases, extensive protection against external influences is therefore no longer possible in principle, as the corresponding building cannot be strengthened to the full extent required for this.

SUMMARY OF THE INVENTION

The problem addressed by the invention involves identifying a remedial measure in this respect and providing a pressure relief system for the containment of a nuclear power plant which allows effective and reliable operation of a wet scrubber for the venting flow with a simultaneously compact design, particularly with regard to the amounts of washing fluid to be made available. Furthermore, a particularly advantageous operating method for a pressure relief system of this kind is to be specified.

The invention is based on the knowledge that an improvement in known pressure relief systems and associated scrubber facilities can be achieved through the passive development of existing water reservoirs, including in existing plants, to achieve higher safety standards. This facilitates a simplified layout of the containment and associated security systems and substantial cost reductions as a result.

The method according to the invention and the facilities are preferably used so that the gases or steam produced during emergency conditions with a core meltdown due to the residual heat released, including leakages, are conducted out of the containment in the event of overpressure and almost completely cleaned of airborne activity before being released into the environment. The activity retained during filtration/scrubbing is advantageously retained directly in the containment. In this way, relevant activity leakages and, as a consequence, ground contamination in the area surrounding the nuclear power facility can be prevented.

With the design according to the invention, it is possible by producing passive propellant pressure by using accident-related pressure gradients, preferably combined with passive filling level control, for the water level (more generally: the washing fluid level) in the scrubber facilities to be filled up at the start of the venting process and/or constantly kept within the desired range. In this case, fluid accumulations which exist in any case or are created as a result of the accident are used as washing fluid reservoirs, so that reliable operation is guaranteed, even with very small-sized external or additional storage containers.

In this case a propellant pressure may be generated passively, particularly through selective throttling of the venting flow in the gas inlet region of the scrubber facility utilizing flow-dynamic relationships, which propellant pressure draws the washing fluid into the scrubber facility. The necessary negative intake pressure may be produced automatically, for example by selective throttling and a drop in pressure in the Venturi tube of a Venturi washer.

In this case, a negative propelling pressure differential >0.1 bar, preferably >0.3 bar or even 1 bar, preferably with a high pressure in the containment at the start of venting >1 bar (preferably at least 2 bar absolute, particularly preferably >4 bar absolute), in relation to the feeding water reservoir, e.g. the building sump in a pressurized water reactor or the wet well in a boiling water reactor, is produced in the gas inlet region of the scrubber facility, e.g. by nozzles, especially Venturi nozzles, perforated nozzles and similar variants.

The flow speed of the venting flow in the region of the Venturi neck (Venturi speed for short) is preferably set in such a manner, taking account of the installation site, that an adequate suction pressure can be generated. This may mean that when the Venturi scrubber is installed 10 m above the existing water reservoir, for example, in order to generate suction pressure, particularly high Venturi speeds are selectively operated which correspond to a pressure drop >1 bar, for example, during the system initiation at the Venturi nozzle and therefore lie in the region of 200 m/s, more probably 250 m/s. When combined with the following throttle (see below), there is therefore a pronounced two-stage pressure drop in the venting line overall. Although the lower internal scrubber pressures then lead to higher gas volume flows, the greater empty pipe speeds which are possible, as described further down, mean that a compact structural design is nevertheless possible.

The water suction lines may furthermore be sized in such a way that even with a boiling pool with steam bubble formation in the suction line, effective plug conveying is made possible, particularly through a sufficiently small diameter of <25 mm, advantageously <15 mm.

Through a combination of suction lines of different nominal widths, initial rapid filling and subsequent filling level top-ups, including with a boiling pool, can each be separately optimized.

The aforementioned measures mean that comparatively large height differences of 5 to 10 m, for example, between the water reservoir (more generally: washing fluid reservoir) and the scrubber unit can be overcome.

The scrubber unit may furthermore be arranged in a protected, in particular a relatively high, region of the building, so that high-energy influences, for example, can be safely kept away from it. Alternatively, the scrubber facility may also be at a relatively low level, right in the sump area or in the flooding area of the containment. With an arrangement of this kind of the scrubber facility in the flooding area, the decay heat that can be removed by ambient cooling can be increased to values >100 kW.

However, the inlet opening of the venting line is advantageously arranged above the maximum flooding filling level that can be expected in the containment in all installation configurations, so that it is ensured that only containment atmosphere is drawn off.

A graduated configuration of the washing fluid tank in the Venturi scrubber with a comparatively small inner pool within an enclosing, that is outer and larger, pool is particularly advantageous, wherein the washing fluid suction port of the Venturi nozzle communicates with the inner pool. The outer pool also referred to below as the washing fluid tank surrounds the entire arrangement and is used to receive the recycled washing fluid and also the overflow from the first pool. The inner pool is filled very quickly, as filling occurs directly when the pressure relief system is started with a maximally driving pressure differential and only small quantities of water are required until it overflows.

The very small quantities of water in the inner pool mean that the "dry" Venturi scrubber can be started simultaneously on the venting gas side and on the washing fluid side or only staggered by a fitting runtime, as the introduction of small quantities of washing fluid causes the Venturi neck region to overflow and therefore when the gas is conveyed, the washing fluid suction/injection in the high-speed region of the Venturi nozzle and therefore the effective aerosol and iodine retention takes place in a virtually instantaneous manner.

In other words, the short filling times for the inner pool of preferably <3, particularly preferably <1 min, mean that the washing fluid filling only becomes necessary in venting mode. This means that an unfilled, dry scrubber facility can be retained for accident operation, which is particularly advantageous in respect of cost, weight, etc. With this favorable layout, the Venturi scrubber unit can be closed in standby mode on the intake side by bursting foils and/or using spring-loaded or weight-loaded overflow valves or the like. At the onset of an accident, these closures open automatically as a result of the pressure differentials and/or temperature increases occurring, so that a pressure and temperature compensation with the containment atmosphere takes place.

After the first fill, the adjustment and control of the filling level in the scrubber is preferably carried out in (quasi-)stationary venting mode via a float filling level control, preferably using a dirt-proof control ball lock or rotary slide valve. By connecting the two mechanisms in series, greater filling reliability can be achieved. In this case, for example, the control ball lock can be inserted at the water outlet and a rotary slide valve included upstream—integrated in the top-up line.

In particular, in venting mode and where evaporation occurs, e.g. through incoming overheated gas and/or through decay heat in the scrubber, the quantity of water evaporated in each case is passively fed back out of the reservoir.

It has proved particularly favorable for the scrubber unit to be substantially at containment temperature through the internal installation in the containment, so that during starting there are no relevant changes in the containment atmosphere removed by the valve line, e.g. through steam condensation, in the Venturi pool and the $H_2/O_2$ concentration therefore remains constant. This leads to a substantial increase in safety.

Furthermore, in an loss of ultimate heat sink (LUHS) situation with a dry sump and with furthermore cooled fuel elements, in order to limit the containment pressure an increased throughput through the pressure relief system with additional air suction via sump lines (in other words, washing fluid supply lines) otherwise provided to draw out sump water can be advantageously set.

In a further advantageous embodiment it is possible, even in after-venting mode without throughput, when there is a small incidence of decay heat of 10 to <50 kW, for example, through the combination of evaporation and convective heat delivery via the surfaces of the scrubber facility, to remove the heat generated and thereby achieve complete passivity and independence of the facility, even during long-term operation.

Where there is a higher incidence of decay heat, there may be a selective build-up of steam pressure in the inside of the scrubber unit (due to a steam cushion forming over the washing fluid located therein) and therefore an automatic draining-back of the charged washing fluid via the initial section of the venting line into the containment.

In addition, an additional water reservoir is used to fill or refill the scrubber facility, e.g. in the form of reservoir tanks arranged at ground level and the like. In this case, the water supply for the scrubber facility is established by an independent pump unit, for example, which is operated by a battery module or via compressed air cylinders. Through the combination of filling by sump water, for example, and/or additional filling by the other aforementioned water reservoirs, a reliable long-term heat removal is ensured, even when there are very high decay heat outputs in the scrubber.

Alternatively or simultaneously, by attachment to an existing emergency cooling or spraying system, access to a further water reservoir can also be ensured or another pool from which to draw off created. By combining with emergency cooling and spraying systems of this kind and through additional filling from other reservoirs, a further increase in safety and also long-term heat removal, even during the incidence of very high decay heat outputs in the scrubber, can be guaranteed.

In a further variant, the scrubber unit is filled from outside the containment via the pressure relief line (venting line), e.g. with the help of an external water reservoir under gas pressure. The filling in this case may be limited by a suitable choice of height of the line connection, so that overflowing means that a corresponding limit and advantageous adjustment of the filling level has been reached. This filling from outside also proves particularly advantageous after a venting process and may take place in order to flush the activity-charged washing fluid back into the containment.

The Venturi section in the Venturi scrubber is advantageously formed by long Venturi tubes, the washing fluid suction region whereof lies deep in the pool and which blows out above the washing fluid level for the most part.

These Venturi units are preferably operated at the high Venturi speeds of >150 m/s, preferably >200 m/s, known from German patent DE 103 28 773 B3 (corresponding to U.S. Pat. No. 8,218,709)—relative to the washing fluid suction area on the Venturi neck—combined with a further subsequent critical throttling.

Venturi tubes—round venturis or also flat venturis—within a neck area region >2 cm$^2$ to 20 cm$^2$ are preferably used in order to guarantee a minimum number and, with simultaneously small dimensions of <5 cm thick, preferably <3 cm thick to guarantee short washing fluid feed-in paths and washing fluid suction slits/areas of <50% of the neck areas, preferably at an angle of 30° to 90° to the Venturi axis, to achieve an optimum separating process.

In some cases, a version with short Venturi tubes or a combination of short and long Venturi tubes which blows out below the water level may also be advantageous.

The separation of the washing fluid from the gas flow purified in the Venturi tube preferably takes place in stages:

Part of the charged washing fluid is separated right at the Venturi outlet by impact separation. To further minimize the water requirement during the start-up phase, there can be a separation of the Venturi fluid at the outlet pipe by an impact separator and selective return into the suction region. In addition, very high empty pipe speeds of >1 to 3 m/s, for example, and selective drop entrainment which leads to further harmful substance separation through the formation of highly effective reaction surfaces, are advantageously set.

In a subsequent, highly effective centrifugal force separator stage which preferably contains a high-speed blade separator with a high-speed and low-speed range, particularly with >3, preferably >10, blade rows which are preferably flowed through horizontally at speeds >5 m/s h, in order to achieve small limiting droplet diameters <10 μm, the washing fluid is separated from the gas flow and conducted back into the pool.

By using an upstream agglomerator/demister, there is a possibility of reducing the limiting droplet diameter to values <5 μm and therefore greatly increasing the separation rate, particularly of small drops.

In a further demister stage which is preferably occupied by metal fibers of >60 μm thickness graduated to ≥8 ρm thickness, a further agglomeration of the remaining fine droplets and also a partial separation of fine aerosols can also take place. In addition, further fiber mats with a finer configuration or sintering pore filters can be included downstream.

This particular combination with permanently high Venturi speeds—adjusted by subsequent critical throttling—and the high empty pipe speed and also the centrifugal force and demister separation allows a separation/retention of aerosols with a particle diameter of >1 μm to >99.9% and simultaneously also for penetrating fine aerosols with particle diameters of <1 μm at least to >99.9, and also a parallel iodine separation of up to >99%.

In addition, by the dropping of direct feeding of chemicals, such as sodium hydroxide (NaOH) and/or thiosulphates, for example, and/or and other iodine retention substances or pH value buffer substances, effective iodine sorption is achieved. The inclusion of this chemical feed may take place via pressure differential release or via a thermally soldered valve, for example.

The combination illustrated particularly enables a very high gas throughput to take place in the smallest space. It is thereby possible for very compact, throughput-intensive Venturi units to be formed which can additionally be divided (split) into small Venturi scrubber units. In this way, units can be integrated in areas with only very limited installation space available within the containment.

This leads to a crucial increase in functional reliability of the venting facilities, particularly due to the protective action of the containment against external influences (EVA). Furthermore, a building screening effect with significantly reduced costs is simultaneously achieved.

The individual facilities in this case are advantageously connected in a communicating manner and may, particularly in the case of separate float valve feeding, be housed individually or in groups at different levels too.

In summary, the advantages achieved using the invention are particularly that by means of a scrubber facility of a containment pressure relief system installed outside the containment, which scrubber facility is connected to a reservoir for washing fluid located within the containment, a passive first fill and subsequent feeding of the scrubber facility, preferably with float filling level control, is made possible through system-inherent suction pressure generation facilitated as a result of accident conditions with a simultaneously particularly compact, space-saving design. Particularly when using a high-speed Venturi scrubber controlled by subsequent critical pressure relief of the venting flow during sliding pressure operation, highly effective activity retention can be achieved. The fact that during normal power station operation a "dry" scrubber facility not filled with washing fluid can be kept on standby for accident operation means that further advantages in relation to cost, weight, etc. are achieved.

An exemplary embodiment of the invention is explained in greater detail below with the help of a drawing. In this case, the single FIGURE provides a highly simplified, schematic depiction of an overview of a nuclear power station of the pressurized water reactor type with a containment pressure relief system.

Other features which are considered as characteristic for the invention are set forth in the appended claims.

Although the invention is illustrated and described herein as embodied in a pressure relief system for the containment of a nuclear power facility, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is an illustration of a nuclear power plant according to the invention.

DETAILED DESCRIPTION OF THE INVENTION

Referring now to the single FIGURE of the drawing in detail, there is shown a nuclear power facility 2 depicted in sections of a nuclear power plant of the pressurized water reactor (PWR) kind. Within a safety enclosure referred to as a containment 4 with a safety casing hermetically sealed against the outside environment made of stainless steel and/or reinforced concrete is arranged a reactor space which contains the reactor pressure vessel (not shown), among other things. The safety casing is also referred to in an alternative nomenclature as a safety enclosure or containment casing. The containment inner chamber enclosed by the safety casing has itself also hitherto been referred to in short as the containment. The reactor pressure vessel and also further nuclear system components, where appropriate, may be separated by partition walls not shown here from plant rooms within the containment 4 with a non-nuclear inventory, although this is not dealt with there.

Despite many and various safety measures, during serious accidents with a massive release of steam there may be a critical overpressure within the containment 4 which could endanger the integrity of the containment 4.

In order to counter scenarios of this kind from the very start where possible, in the nuclear power station, a containment spray system or spray system 10 for short is provided with a plurality of spray nozzles 12, particularly in the ceiling area of the containment 4. By spraying fluid 14, a cooling of the systems components arranged in the containment 4 which have heated up due to an incipient accident is achieved by evaporative cooling.

The spray nozzles 12 are supplied for this purpose with the fluid 14 to be sprayed—usually water which is combined with additives or chemicals where appropriate—via a supply line 16, the fluid being removed from a storage tank 18. The storage tank 18 in the exemplary embodiment in this case is located outside the containment 4, so that the fluid 14 stored therein remains comparatively cool, even if the containment 4 is greatly heated. Correspondingly, the supply line 16 is conducted through a duct 20 in the containment. In order to transport the fluid 14 from the storage tank 18 to the spray nozzles 12, an electrically powered delivery pump 22, preferably with its own emergency power supply, is provided for example. In the exemplary embodiment, the delivery pump 22 is arranged in the line section within the containment 4, although it may also be outside.

Instead of or in addition to the externally installed storage tank 18, further fluid reservoirs may be present, namely also within the containment 4. These also include, apart from internal storage tanks and storage basins, for example, geodetically elevated flood basins which allow fluid already held within the containment 4 to be released where necessary in a gravity-driven or gravity-supported manner.

The fluid 14 sprayed when using the spray system 10, for example, or the fluid 14 released during the flooding of building sections and system components with the help of a corresponding emergency cooling system or flooding system, which fluid has not evaporated, accumulates along with condensate and any leakage fluids present mainly in the sump 24 in the floor area of the reactor building or containment 4. In this case the sump 24 creates a pressure-equalized basin or reservoir 100 which is open towards the remaining inner space of the containment 4.

Nevertheless, as the accident progresses the internal pressure within the containment may approach and even exceed a critical value, if the measures mentioned hitherto and any further measures do not result in stabilization.

In order to gain control of serious accidents of this kind too, in the case of the nuclear power facility according to FIG. 1, a filtered pressure relief of the containment 4 is provided where necessary as an integral part of the safety system (filtered containment venting). This involves a pressure relief line 28, which is closed by a shut-off valve during normal operation of the nuclear power facility, being conducted through the containment, through which line a pressure relieving flow is conducted out of the containment 4 into the outside environment in pressure relief mode when the shut-off valve 26 is open. This process is also referred to as venting. The predominantly gaseous pressure relief flow, which particularly contains steam constituents and also non-condensable gases, is referred to accordingly as the venting flow. The pressure relief line 28 is also called the venting line. The system as a whole is referred to as a venting system 30.

As already mentioned, when the nuclear power facility is operating normally, the pressure relief line 28 is closed. It is fitted with the shut-off valve for this purpose which is configured as a twin valve with two series-connected individual valves (tandem configuration). Viewed in the flow direction 32 of the venting flow, the shut-off valve 26 lies directly behind the associated duct 34 passing through the containment. In order to initiate the venting process, the shut-off valve 26 is opened, so that the venting flow then passes through the pressure relief line 28 as envisaged.

In order to reduce the release of radioactive activity into the environment during venting to a justifiable degree, corresponding retention systems in the form of filter devices and scrubber facilities are inserted into the pressure relief line 28.

In particular, a wet scrubber 36 for the Venturi scrubber-type venting flow is present, which wet scrubber is arranged within the containment 4 and is therefore particularly well protected against external influences. The wet scrubber 36 contains a washing fluid tank 38, or a washing tank for short, with an enclosing wall sealed in respect of the environment. At least one Venturi tube 40, preferably a plurality of Venturi tubes 40, is arranged, preferably in a vertical or slightly inclined orientation in the washing fluid tank 38. On the input side, the respective Venturi tube 40 is connected at its lower end to the upstream initial section of the pressure relief line 28, the inlet opening 42 of the Venturi tube 40 lying within the containment 4. On the output side, the outlet opening 44 of the Venturi tube 40 lying further up projects into the washing fluid container 38. In the neck portion lying there-between, which tapers in the manner of a Venturi tube or a Laval nozzle, more precisely at the narrowest point referred to as the throat point 46, the Venturi tube 40 has a suction port 48 for washing fluid configured in the manner of a slot, for example, particularly as an annular slot in the case of round Venturi tubes.

In the case of the hitherto predominantly customary system design, the washing fluid tank 38 is filled with a washing fluid 52 during venting up to a design filling level 50 which lies above the suction port 48 and below the outlet opening 44. This method of operation is illustrated in the right half of the wet scrubber 36 depicted in the FIGURE (the left half and the right half each represent different operating states of one and the same scrubber device). The venting flow entering the Venturi tube 40 from below reaches its greatest flow speed at the throat point 46 and in so doing draws the surrounding washing fluid 52 out of the washing fluid tank 38 via the suction port 48, which washing fluid is entrained in the form of a fine mist of droplets. Due to the fragmentation and misting of the washing fluid 52, an internal interaction takes place within the Venturi tube 40 between the venting flow and the washing fluid 52, as a result of which airborne or gas-borne activity entrained in the venting flow in the form of aerosols and iodine compounds are deposited in the washing fluid droplets.

The venting flow mixed with the activity-laden washing fluid mist then leaves the outlet opening 44, preferably in the manner of a freely blowing arrangement at the upper end of the Venturi tube 40, in other words above the washing fluid level. A first separation of the washing fluid 52, on the one hand, and the gaseous venting flow, on the other, takes place there at an impact separator 54. In this case, the radiologically active components remain for the most part bound in the washing fluid 52 which sinks down again according to the principle of gravitational separation. The cleaned venting gas flow, on the other hand, accumulates above the washing fluid level and enters the downstream section of the pressure relief line 28 after flowing through a fine separator 56, also referred to as a demister, into the downstream section of the pressure relief line 16 which is connected to the head of the washing fluid tank 38.

Water is preferably substantially used as the washing fluid 52, water being combined with chemical additives or reagents from a chemical tank 58, where necessary.

The chemical tank 58 in the exemplary embodiment in this case is connected to the washing fluid tank 38 via a connection line 60. It is preferably installed in a geodetically elevated position, so that the feeding of chemicals into the washing fluid tank takes place purely passively by gravity. A preferably adjustable throttle valve 62 in the connection line 60 produces the desired dosing. Instead of the feeding of chemicals provided for here straight into the washing fluid tank 38, the chemical tank 58 may be attached to the pressure relief line 28 upstream of the wet scrubber 36, so that the venting flow entrains the chemicals within the pressure relief line 28 and transports them into the washing fluid tank 38.

Instead of a single wet scrubber 36, there may also be a plurality of wet scrubbers 36 inserted in parallel fluidically, particularly in order to adapt to existing structural circumstances within the containment 4. To this end, upstream of the scrubber section split into partial units in this manner (split version) the pressure relief line 28 has corresponding branches to partial sections and unions/junctions possibly upstream of the scrubber section.

Downstream of the wet scrubber 36 the cleaned venting flow initially passes through the duct 34 through the containment and finally through a throttle valve/throttle device 64 inserted in the external portion of the pressure relief line 28. It is relaxed during this approximately to the ambient atmospheric pressure. Further filtration devices 66 not shown here, particularly of the dry filter and/or sorbent filter type, may also be present upstream or downstream of the throttle valve 64 or also in a bypass configuration in this portion of the pressure relief line 28. Finally, the cleaned and pressure-relieved venting flow is released into the environment via a flue 68 or another outlet opening.

The pressure relief system 30 in the present case is configured for particularly high retention rates of the wet scrubber 36 during venting operation. As described in German Patent DE 103 28 773 B3, at the time submitted by Framatome ANP GmbH (now AREVA GmbH), this is possible in that a particularly high flow speed of the venting flow, measured at the throat point 46 of the Venturi tube 40, of 150 m/s or more, preferably of 200 m/s to 250 m/s or more, for example, is set. This is achieved purely passively through the so-called critical pressure relief of the venting flow at the throttle valve 64 in sliding pressure regime. For details of the system design which makes this possible, particularly with regard to the configuration and dimensioning of the flow-guiding components, and also the associated method aspects, reference is made to the aforementioned patent DE 103 28 773 B3 which is hereby expressly incorporated by reference in the present description.

Correspondingly, the end portion of the pressure relief line 28 lying upstream of the throttle device 64 during venting operation forms a low-pressure section approximately at atmospheric pressure (approximately 1 bar). The starting section of the pressure relief line 28, on the other hand, forms by contrast a high-pressure section approximately at containment pressure (typically 2 to 4 bar or more at the start of venting). However, a quite clear drop in pressure (typically of roughly 0.3 to 1 bar) usually likewise occurs in the Venturi tube 40 of the wet scrubber 36 and/or also before this at the Venturi inlet, particularly with the design preferred in the present case for this desired effect. A throttle portion 102 in the pressure relief line 28 configured in this manner upstream of the outlet opening 44 into the washing fluid tank 38, which throttle portion can be expanded, comparatively speaking, in the flow direction 34 or also concentrated in one or more short throttle points, is only suggested schematically in the FIGURE. With this kind of clear characterization of the pressure stages (two-stage pressure drop) it is therefore possible to refer to a high-pressure portion upstream of the Venturi tube 40, a mid-pressure portion in the line portion lying further downstream up to the throttle device 64 and a low-pressure portion downstream of the throttle device 64 (in relation to the venting operation).

As already expressed in the aforementioned German Patent DE 103 28 773 B3, a central problem when operating a pressure relief system 30 of this kind is the decay heat of the fission products accumulating in the washing fluid 52. This is because the decay heat leads to the evaporation of the washing fluid supply in the wet scrubber 36, which is associated with the risk of "dry running". This, in turn, would to a large extent bring about the loss of the actually desirable filter and retention function. This problem is made even worse in the present case by the installation of the wet scrubber 36 within the containment 4 which may possibly be greatly heated in accident situations. In the plant according to German Patent DE 103 28 773 B3, the problem is solved in that, on the one hand, a recycling of activity-loading, hot washing fluid 52 into the containment 4 is provided. On the other hand, the initial washing fluid store in the wet scrubber 36 is comparatively generously sized. In addition, the "used" washing fluid 52 from evaporation and recycling in the wet scrubber 36 is replaced by subsequent feeding of comparatively cold washing fluid from an external storage tank. This results in comparatively large-capacity tanks with a corresponding space requirement and high production and maintenance costs.

In order to avoid this, an essentially different approach is taken with the pressure relief system 30 according to the FIGURE of the drawing.

The wet scrubber 36 is namely kept dry in standby mode (that is: when the nuclear power station is in normal operation). The washing fluid tank 38 is only filled with washing fluid 52 when the venting operation begins. For this purpose, the fluid 14 accumulating in the sump 24 of the containment 4 under accident conditions, referred to in this case as sump water 70, is transferred into the washing fluid tank 38 and used there as washing fluid 52. The transfer preferably takes place purely passively without resorting to electrically operated or otherwise active components.

Instead of the sump 24 or in addition to it, another reservoir 100 within the containment 4 filled with fluid 14 under accident conditions may be used for the removal of washing fluid 52. Advantageously, this is a reservoir 100 which is connected to the remainder of the containment 4 fluidically or on the gas pressure side, such that an overpressure existing there in respect of the environment outside the containment 4 is transferred at least in part, preferably almost completely or completely, to the reservoir 100. In this way, the passive transportation of fluid 14 into the wet scrubber 36, namely ultimately as a consequence of the overpressure in the containment 4, as described in detail below based on the example of the sump water reservoir, is guaranteed.

In concrete terms, an overflow line which acts as a top-up line or a supply line 72 for the sump water 70 is conducted from the sump 24 into the washing fluid tank 38 of the wet scrubber 36. The inlet opening 74 of the supply line 72 is arranged preferably as low as possible in the floor area of the sump 24, which sump has usually been flooded during the preceding accident sequence, possibly through the operation of the spray system 10 and/or through a corresponding emergency cooling system or flooding system. In other words, the supply line 72 is immersed in the sump water 70 then present on the inlet side. At the other end, the supply line 72 opens out into the inner space of the washing fluid tank 38. The supply line 72 can be freely flowed through in the flow direction 76 provided for to the wet scrubber 36 and, if need be, is initially sealed by a bursting foil or the like which automatically opens in accident conditions (see below). It may, however, be provided with a nonreturn valve 78 to prevent flow-back, particularly when an additional supply line coming from another reservoir opens out further downstream as in this case.

When the venting operation begins, there is preferably still no washing liquid 52 present in the washing fluid tank 38 of the wet scrubber 36; instead it is dry. The accident-related pressure rise in the containment 4 means that a one-stage pressure gradient has initially developed at the shut-off valve 26. However, as soon as the venting operation is started by opening the shut-off valve 26 in the pressure relief line 28, the dual pressure grading described above with a high-pressure portion, a mid-pressure portion and a low-pressure portion in the pressure relief line 28 develops as a result of the sealing of the line system and due to the underlying flow dynamic. The pressure differential existing between the sump region of the containment 4 and the inner space of the washing fluid tank 38 of typically 0.3 to 1 bar or more then drives the sump water 70 from the sump through the supply line 72 into the wet scrubber 36, where it is active as a washing fluid 52. In this way, the initial filling and also the subsequent feeding of washing fluid 52 consumed by evaporation also takes place preferably purely passively from an internal reservoir which is in any case present due to the underlying accident conditions.

In order to keep the wet scrubber 36 reliably dry while in standby mode, something that may be desirable in order to prevent corrosion, for example, it is possible for the upstream initial section of the pressure relief line 28, around the area of the inlet opening 42, to be sealed initially with a bursting foil or another sealing device which preferably opens automatically when a defined pressure differential is applied under accident conditions. The same applies to the inlet of the supply line 72 immersed in the sump 24. As soon as the sealing device has cleared the flow path, the conditions illustrated above in relation to the pressure grading apply.

Based on the design explained above, an additionally present external storage tank 80 for washing fluid 52 may exhibit a comparatively small volume compared with previous plants. Due to the external installation of the storage tank 80, that is to say outside the containment 4, a lead-through of the additional supply line or connection line 82 from the storage tank 80 to the wet scrubber 36 through the containment is necessary. The storage tank 80 is installed in a geodetically high position, for example, such that a feeding or refeeding of washing fluid 52 into the washing fluid tank 38 is made possible by the forces of gravity. Alternatively or in addition, a delivery pump is inserted in the connection line 82, which pump is driven by a drive motor of the electric motor type, for example, or by a gas expansion motor or the like. Corresponding emergency power units, batteries, storage batteries, compressed gas canisters, etc. are present for this purpose. As shown in the FIGURE, a direct usage of compressed gas from a compressed gas canister 84 as the propellant for the washing fluid 52 to be transported to its destination can also be provided for.

In order to keep the number of ducts through the containment to a minimum, double usage of the pressure relief line 28 may also be provided for, in order to conduct the washing fluid 52 from the external reservoir or storage tank 80 against the flow direction 32 of the venting flow into the washing fluid tank 38. For this purpose, the connection line 82 is connected to the pressure relief line 28 downstream of the shut-off valve 26 and upstream of a further shut-off valve 86, viewed in the flow direction 32 of the venting flow. In order to supply washing fluid 52 into the washing fluid tank 38, the venting flow is then briefly interrupted in each case by closing the shut-off valve 86.

As already described above, the initial filling of the wet scrubber 36 with washing fluid 52 takes place at the same time as the start of the venting process, due to the dynamically adjusted pressure differential between the washing fluid tank 38, which has a reduced pressure in its inner space, and the containment pressure prevailing in the region of the sump 24. In order to keep the initial dry operation of the wet scrubber 36 as short as possible, the washing fluid tank 38 is configured with suitably selected inner contouring and/or inner partitioning, such that there is a comparatively quick rise in the washing fluid level in the region of the suction port 48 of the Venturi tube 40 during the introduction of washing fluid 52 from the internal or external reservoir.

As shown in the FIGURE, within the comparatively large washing fluid tank 38 which encloses the Venturi arrangement as a whole and seals it in respect of the environment, a substantially smaller, upwardly open washing fluid tank or pool 88 may be arranged, for example, which encloses the Venturi tube 40 in the region of the throat point 46 with the suction port 46 and in which the outlet opening 90 of the supply line 72 is immersed or opens out. This small pool 88 configured in the exemplary embodiment in the manner of a collecting funnel or an upwardly open annular chamber also particularly collects the washing fluid droplets falling from the impact separator 54 as completely as possible. For this purpose, a return line 92 of a separator of this kind may be conducted straight back into the pool 88.

The pool 88 has a volume of <1/10 of the total volume of the washing fluid tank 38, for example—relative to the design filling level 50—and, accordingly, fills up to the upper edge within the shortest time, for example <10 min, preferably <3 min, at the start of the combined venting and filling process, as indicated in the left half of the wet scrubber 36 shown in the FIGURE. As a result of this, the wet scrubbing of the venting flow described further above starts very early. As the venting operation progresses, the remaining washing fluid tank 38 is also filled up to the desired design filling level 50 for stationary operation, which guarantees particularly balanced operating conditions.

A configuration of this kind is practical particularly when a plurality of Venturi tubes 40 inserted in parallel fluidically via a distributor is arranged within the enclosure formed by the washing fluid tank 38, because the enclosing washing fluid tank 38 is then necessarily relatively large in volume. Each or at least the vast majority of the Venturi tubes 40 in this case is advantageously provided with its own small pool 88 for rapid initial filling.

During (quasi-)stationary operation, automatic control of the washing fluid filling level in the washing fluid tank 38—as indicated in the right half of the wet scrubber depicted in the FIGURE—may be realized by a passive float valve 94 or the like in the supply line 72. In other words, the valve body of the control valve is actuated depending on the current level by a float mechanically connected to it in the washing fluid tank 38.

A continuous or occasional return or recirculation of washing fluid 52 from the washing fluid tank 38 into the containment 4 sump 24 via a return line not shown here may optionally be provided for.

Since in the case of a pressurized water reactor, a significant release of hydrogen within the containment atmosphere, which is only rendered slightly inert or not at all, can be expected in serious accident situations, care should be taken to ensure that no accumulations of potentially explosive gases can occur in the lines and devices of the pressure relief system 30 or be conducted into these. To this end, a catalytic recombination device 96 for catalytically supported or initiated hydrogen removal in the gas flow entering the pressure relief line 28 may be inserted upstream of the inlet opening 42 of the pressure relief line 28. This device is preferably of the type described in the German Patent Application DE 10 2012 211 897.7, filed by AREVA NP GmbH (now AREVA GmbH), but preferably without the convection cooling module optionally present in that case. The associated application documents are hereby expressly declared as an integral part of the present description (incorporation by reference).

By means of a catalytic unit of this kind in the incoming flow region of the venting line, the $H_2/O_2$ concentration in the venting gas flow can be almost entirely removed. The high temperatures thereby created in the venting gas flow are advantageously lowered by the immediately following washing liquid supply in the wet scrubber 36, in other words by direct cooling ("quenching"). The venting gas flow, which is almost hydrogen-free, cleaned and temperature-adjusted in this way, can be safely diverted, so that critical hydrogen mixtures are essentially ruled out.

Even if in the preceding description the particularly important case of a pressurized water reactor with removal of the washing fluid from the building sump was emphasized, it is still possible to resort to other fluid reservoirs within and/or outside the containment 4. For example, flood basins, storage basins or storage tanks installed in the containment 4 are possible as reservoirs for washing fluid to be removed. Internal reservoirs of this kind have the advantage that the passive conveying mechanism described above can normally be used by exploiting pressure differentials caused by venting between the inner space of the wet scrubber and the other containment volume. Alternatively or in addition, external reservoirs can be resorted to, insofar as corresponding connection lines are installed with ducts through the containment. In this case, however, the transportation of fluid acting as the washing fluid must usually take place against the existing pressure gradient between the containment 4 and the external environment with the use of active conveying means such as pumps, propellant gases and the like. In particular, however, in an initial accident phase in which electric pumps and the like are still reliably available, active feeding of internal reservoirs from external reservoirs can still take place in this respect. In a later accident phase, the passive transportation of fluid from the previously filled internal reservoirs to the wet scrubber can then take place as described above.

For example, a direct connection to the emergency cooling system or the spray system 10 and the storage tank 18 thereof may be provided in this context. For this purpose, a feeding line 98 branches off from the supply line 16 leading to the spray nozzles 12 in the exemplary embodiment according to the FIGURE downstream of the delivery pump 22, which is united with the supply line 72 fed from the sump 24 further downstream or, alternatively, is conducted separately into the washing fluid tank 38.

Moreover, the design described can also be used with a boiling water reactor, insofar as the installation space available in the containment permits the internal installation of the scrubber units. Passive suction of condensate used as washing liquid from a wet well can take place there, for example.

The following is a summary list of reference numerals and the corresponding structure used in the above description of the invention:

2 Nuclear power facility
4 Containment
10 Spray system
12 Spray nozzle
14 Fluid
16 Supply line
18 Storage tank
20 Duct
22 Delivery pump
24 Sump
26 Shut-off valve
28 Pressure relief line
30 Pressure relief system
32 Flow direction
34 Duct
36 Wet scrubber
38 Washing fluid tank
40 Venturi tube
42 Inlet opening
44 Outlet opening
46 Throat point 48 Suction port
50 Design filling level
52 Washing fluid
54 Impact separator
56 Fine separator
58 Chemical tank
60 Connection line
62 Throttle valve
64 Throttle valve
66 Filtration device
68 Flue
70 Sump water
72 Supply line
74 Inlet opening
76 Flow direction
78 Nonreturn valve
80 Storage tank
82 Connection line
84 Compressed gas canister
86 Shut-off valve
88 Pool
90 Outlet opening
92 Return line
94 Float valve
96 Recombination device
98 Supply line
100 Reservoir
102 Throttle portion

The invention claimed is:

1. A pressure relief system for a containment in a nuclear power facility, the pressure relief system comprising:
   a shut-off valve;
   a pressure relief line guided through the containment and being closed by said shut-off valve, said pressure relief line conducting a pressure relieving flow out of the containment when said shut-off valve is open;
   a wet scrubber disposed in a portion of said pressure relief line inside the containment, wherein said wet scrubber is a Venturi scrubber having a Venturi tube disposed in a washing fluid tank, said Venturi tube having a throat point with a suction port for Venturi injection of the washing fluid into the pressure relief flow;
   a reservoir disposed inside the containment and fluidically connected to an inner space of the containment such that any overpressure, with respect to surroundings outside the containment, prevailing in the containment is transferred at least in part to said reservoir;
   a supply line leading from said reservoir to said wet scrubber for supplying said wet scrubber with a fluid, acting as a washing fluid, from said reservoir;
   said wet scrubber having a washing fluid tank sealed off from an inner space of the containment;
   a throttle portion formed in a portion of said pressure relief line which is upstream of a point at which said pressure relief line opens inside said washing fluid tank; and
   wherein said wet scrubber has an inner tank inside said washing fluid tank for the washing fluid, said inner tank surrounding said Venturi tube only in a region of said throat point and said suction port of said Venturi tube, a capacity of said inner tank is substantially smaller than a capacity of said washing fluid tank.

2. The pressure relief system according to claim 1, wherein said reservoir is a pool which is open to the inner space of the containment.

3. The pressure relief system according to claim 1, further comprising a filling level control means for the washing fluid supplied by said supply line, said filling level control means being a float valve inside said washing fluid tank.

4. The pressure relief system according to claim 1, wherein said throttle portion is configured such that, at a start of a pressure-relieving process and at a pressure of at least 2 bar absolute inside the containment, a pressure inside said washing fluid tank is, in contrast, reduced by at least 0.3 bar.

5. The pressure relief system according to claim 1, further comprising a throttle valve disposed in said pressure relief line downstream of said wet scrubber when viewed in a direction of flow of the pressure relief flow, and is configured for critical pressure relief of the pressure relief flow.

6. The pressure relief system according to claim 1, wherein said reservoir is a sump of a pressurized water reactor.

7. The pressure relief system according to claim 1, wherein said wet scrubber is kept dry when in a standby mode by a sealing device configured to open under accident conditions.

8. A nuclear power facility, comprising:
   a containment; and
   the pressure relief system according to claim 1.

9. A method for operating a pressure relief system, including the pressure relief system of claim 1, the method comprising the steps of:
   during a pressure-relieving process, when the shut-off valve is open, conveying the fluid by means of the supply line from the reservoir to the wet scrubber as a result of a pressure differential, which adjusts according to a flow, between the containment and the wet scrubber.

* * * * *